United States Patent
Wang et al.

(10) Patent No.: US 11,206,352 B2
(45) Date of Patent: Dec. 21, 2021

(54) SHOOTING METHOD, APPARATUS, AND DEVICE

(71) Applicant: Huawei Technologies Co., Ltd., Guangdong (CN)

(72) Inventors: Yinting Wang, Hangzhou (CN); Xi Zhang, Hangzhou (CN); Yifan Zhang, Hangzhou (CN); Jinwei Chen, Shenzhen (CN); Haidong Gao, Shenzhen (CN); Changqi Hu, Shenzhen (CN); Ruihua Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/937,384

(22) Filed: Jul. 23, 2020

(65) Prior Publication Data
US 2020/0358954 A1 Nov. 12, 2020

Related U.S. Application Data

(63) Continuation of application No. PCT/CN2019/077640, filed on Mar. 11, 2019.

(30) Foreign Application Priority Data

Mar. 26, 2018 (CN) .......................... 201810254358.5

(51) Int. Cl.
*H04N 5/232* (2006.01)
*H04N 5/225* (2006.01)
*H04N 9/09* (2006.01)

(52) U.S. Cl.
CPC ....... *H04N 5/23245* (2013.01); *H04N 5/2258* (2013.01); *H04N 9/09* (2013.01)

(58) Field of Classification Search
CPC ..... H04N 5/23245; H04N 5/2258; H04N 9/09
See application file for complete search history.

(56) References Cited

U.S. PATENT DOCUMENTS 9,185,291 B1 * 11/2015 Shabtay ............. H04N 5/23296
9,609,200 B2 * 3/2017 Narang .................. G06F 3/041
(Continued)

FOREIGN PATENT DOCUMENTS

| CN | 105979145 A | 9/2016 |
|---|---|---|
| CN | 106210524 A | 12/2016 |

(Continued)

OTHER PUBLICATIONS

Zulkamalober, "Apterture", Apr. 24, 2013, retrieved from https://oberphotographytips.wordpress.com/2013/04/24/aperture-2/ on Apr. 7, 2021 (Year: 2013).*

(Continued)

*Primary Examiner* — Timothy J Henn
(74) *Attorney, Agent, or Firm* — Womble Bond Dickinson (US) LLP

(57) ABSTRACT

The present disclosure discloses a method for image or video shooting. The method is applied to a terminal that includes a first camera, a second camera, and a third camera. The second camera is a black-and-white camera, and the first camera, the second camera, and the third camera are cameras using prime lenses. The third camera is a color camera using a tele-photo lens. The method includes determining at least one camera from the first camera, the second camera, and the third camera based on a target zoom ratio as a target camera. The method further includes capturing, by using the target camera, at least one image that includes a target scene. The method further includes obtaining an output image of the target scene based on the at least one image that includes the (Continued)

| Camera parameters | Features | Target zoom ratio: 1x to 3x | Target zoom ratio: 3x to 5x | Target zoom ratio: 5x to 10x |
|---|---|---|---|---|
| First camera: Equivalent focal length: 27 mm Color camera Resolution: 10 M | Primary camera | Enabled | Disabled | Disabled |
| Second camera: Equivalent focal length: 27 mm Black-and-white camera Resolution: 20 M | High resolution, good resolving capability, large aperture, high performance in a dark environment, and no color information | Enabled | Dark environment: enabled; Non-dark environment: disabled | Dark environment: enabled; Non-dark environment: disabled |
| Third camera: Equivalent focal length: 80 mm Color camera Resolution: 10 M | Tele-photo, relatively small aperture, and too large noise in a dark environment | Disabled | Enabled | Enabled | target scene. According to the present disclosure, an approximately 5× lossless zoom effect is achieved.

12 Claims, 8 Drawing Sheets

(56) References Cited

U.S. PATENT DOCUMENTS

| | | | | |
|---|---|---|---|---|
| 10,129,483 | B2* | 11/2018 | Shroff | G06T 1/0007 |
| 10,200,599 | B1* | 2/2019 | Baldwin | H04N 5/23216 |
| 10,230,898 | B2* | 3/2019 | Cohen | H04N 5/23245 |
| 10,412,367 | B2* | 9/2019 | Lo | H04N 5/232 |
| 2009/0295949 | A1* | 12/2009 | Ojala | G02B 3/0018 |
| | | | | 348/240.99 |
| 2010/0060746 | A9* | 3/2010 | Olsen | H04N 5/2254 |
| | | | | 348/222.1 |
| 2010/0157136 | A1* | 6/2010 | Li | H04N 5/2352 |
| | | | | 348/349 |
| 2011/0122223 | A1* | 5/2011 | Gruber | G03B 37/04 |
| | | | | 348/36 |
| 2013/0093842 | A1* | 4/2013 | Yahata | H04N 5/23238 |
| | | | | 348/38 |
| 2013/0258044 | A1* | 10/2013 | Betts-Lacroix | H04N 5/232 |
| | | | | 348/36 |
| 2015/0078678 | A1 | 3/2015 | Grandin et al. | |
| 2015/0085174 | A1* | 3/2015 | Shabtay | H04N 9/04515 |
| | | | | 348/336 |
| 2016/0212333 | A1 | 7/2016 | Liege et al. | |
| 2016/0353012 | A1* | 12/2016 | Kao | H04N 5/23293 |
| 2017/0011525 | A1* | 1/2017 | Kim | H04N 13/133 |
| 2017/0118407 | A1 | 4/2017 | Cho et al. | |
| 2017/0186163 | A1 | 6/2017 | Kim | |
| 2017/0214866 | A1* | 7/2017 | Zhu | H04N 5/2258 |
| 2017/0236337 | A1 | 8/2017 | Devries | |
| 2017/0359494 | A1 | 12/2017 | Zhou et al. | |
| 2018/0352169 | A1* | 12/2018 | Lee | H04N 5/23238 |
| 2019/0068881 | A1* | 2/2019 | Kim | H04N 5/23245 |
| 2019/0082101 | A1* | 3/2019 | Baldwin | H04N 5/2258 |

FOREIGN PATENT DOCUMENTS

| | | |
|---|---|---|
| CN | 106454077 A | 2/2017 |
| CN | 106921820 A | 7/2017 |
| CN | 106990646 A | 7/2017 |
| CN | 107295225 A | 10/2017 |
| CN | 206698329 U | 12/2017 |
| CN | 107734214 A | 2/2018 |
| CN | 107819992 A | 3/2018 |
| CN | 108391035 A | 8/2018 |
| GN | 101135769 A | 3/2008 |
| GN | 105954881 A | 9/2016 |
| JP | 2005031466 A | 2/2005 |
| JP | 2005109623 A | 4/2005 |
| KR | 20160038409 A | 4/2016 |
| KR | 20160100785 A | 8/2016 |
| KR | 20180132299 A | 12/2018 |

OTHER PUBLICATIONS

PF Staff, "The Crop Factor Unmasked", Jul. 23, 2014, retrieved from https://www.pentaxforums.com/articles/photo-articles/table-of-equivalent-focal-lengths.html on Apr. 7, 2021 (Year: 2014).*

Juan Carlos Bagnell, LG G5 Real Camera Review: Dual Camera Fun, published on Apr. 13, 2016, total 4 pages.

* cited by examiner

| Camera parameters | Features | Target zoom ratio: 1x to 3x | Target zoom ratio: 3x to 5x | Target zoom ratio: 5x to 10x |
|---|---|---|---|---|
| First camera: Equivalent focal length: 27 mm Color camera Resolution: 10 M | Primary camera | Enabled | Disabled | Disabled |
| Second camera: Equivalent focal length: 27 mm Black-and-white camera Resolution: 20 M | High resolution, good resolving capability, large aperture, high performance in a dark environment, and no color information | Enabled | Dark environment: enabled; Non-dark environment: disabled | Dark environment: enabled; Non-dark environment: disabled |
| Third camera: Equivalent focal length: 80 mm Color camera Resolution: 10 M | Tele-photo, relatively small aperture, and too large noise in a dark environment | Disabled | Enabled | Enabled |

FIG. 3

SHOOTING METHOD, APPARATUS, AND DEVICE

CROSS-REFERENCE TO RELATED APPLICATIONS

This application is a continuation of International Application No. PCT/CN2019/077640, filed on Mar. 11, 2019, which claims priority to Chinese Patent Application No. 201810254358.5, filed on Mar. 26, 2018, the disclosures of which are incorporated herein by reference in their entireties.

TECHNICAL FIELD

The present disclosure relates to the field of terminal technologies, and in particular, to a shooting method, apparatus, and device.

BACKGROUND

Zoom is one of most common modes of taking photos. Sometimes, a user needs to shoot a close-up of an object in the distance, such as a statue in the distance and a person three to five meters away, and sometimes, the user wants to adjust, by using the zoom, a picture layout for shooting. For example, when a photo is taken with a mobile phone, zoom most commonly used by a mobile phone user is 2×-to-5× zoom.

Manners of achieving the zoom include optical zoom, digital zoom, and the like. Although both the optical zoom and the digital zoom help to zoom in an object in the distance during shooting, only the optical zoom can make an image body larger and relatively clearer by adding more pixels after imaging of the body. Such zoom that is similar to the optical zoom and that not only can zoom in a body area, but also can ensure definition of an image is referred to as lossless zoom.

A shooting terminal usually uses a prime lens or a zoom lens, and a largest difference between them lies in whether optical zoom can be performed. The prime lens cannot perform optical zoom. A central scene can be zoomed in only by approaching the central scene or performing digital zoom by using an image interpolation algorithm. However, the zoom lens can perform optical zoom, and to zoom in an object in the distance, it only needs to adjust a corresponding zoom ratio of the zoom lens within an optical zoom range thereof, to ensure that the object is zoomed in without a loss of details. The zoom lens can zoom in the object in the distance by adjusting a focal length of the lens, so that a user can clearly see details of the object in the distance.

However, the zoom lens is usually relatively large and thick and is commonly found in a digital camera. Directly using such a zoom lens, especially a zoom lens with a high zoom ratio (e.g., higher than 3×), for a portable terminal device (for example, a low-profile mobile phone) is contradictory to the user's pursuit for a low-profile portable terminal device. Therefore, it is a common practice to use a digital zoom technology to zoom in the object in the distance. However, this technology limits improvement on resolving power and definition of imaging. When the zoom ratio is relatively high, an image definition loss occurs.

Therefore, there is an urgent need for a technical solution that can enable imaging of the terminal device to obtain higher resolving power and higher definition while ensuring a low-profile feature of the terminal device.

SUMMARY

Embodiments of the present disclosure provide a shooting method, apparatus, and device, to achieve lossless imaging at a high zoom ratio, thereby improving shooting experience of a user.

Specific technical solutions provided in the embodiments of the present disclosure are as follows:

According to a first aspect, an embodiment of the present disclosure provides a shooting method, where the method is applied to a shooting terminal, and the shooting terminal includes a first camera, a second camera, and a third camera; the first camera and the third camera are color cameras, the second camera is a black-and-white camera, and the first camera, the second camera, and the third camera all are cameras using prime lenses; an equivalent focal length of the third camera is greater than both an equivalent focal length of the first camera and an equivalent focal length of the second camera; and the method specifically includes:

obtaining a target zoom ratio;

determining at least one camera from the first camera, the second camera, and the third camera based on the target zoom ratio as a target camera;

capturing, by using the target camera, at least one image that includes a target scene; and obtaining an output image of the at least one target scene based on the at least one image that includes the target scene.

The target scene is an area that a user ultimately expects to shoot, and may also be understood as a preview image at the target zoom ratio in a terminal; therefore, there is a correspondence between the target zoom ratio and the target scene.

According to a second aspect, an embodiment of the present disclosure provides a shooting apparatus, where the apparatus is applied to a shooting terminal, and the shooting terminal includes a first camera, a second camera, and a third camera; the first camera and the third camera are color cameras, the second camera is a black-and-white camera, and the first camera, the second camera, and the third camera all are cameras using prime lenses; an equivalent focal length of the third camera is greater than both an equivalent focal length of the first camera and an equivalent focal length of the second camera; and the apparatus further includes:

an obtaining module, configured to obtain a target zoom ratio;

a determining module, configured to determine at least one camera from the first camera, the second camera, and the third camera based on the target zoom ratio as a target camera;

a capturing module, configured to capture, by using the target camera, at least one image that includes a target scene; and an image processing module, configured to obtain an output image of the target scene based on the at least one image that includes the target scene.

According to the technical solutions of the foregoing method and apparatus provided in the embodiments of the present disclosure, the shooting terminal uses a combination of a plurality of cameras using prime lenses instead of a zoom device of a large volume, so that thickness of the terminal is not significantly increased, thereby achieving an approximately 5× lossless zoom effect. This ensures aesthetics of the terminal, especially for a smart handheld device such as a mobile phone, satisfies the user's requirements for a small-sized low-profile terminal and lossless imaging at a large zoom, and improves use experience of the user.

According to the first aspect or the second aspect, in one embodiment, resolution of the second camera is higher than resolution of the first camera and higher than resolution of the third camera.

According to the first aspect or the second aspect, in one embodiment, resolution of the second camera is higher than resolution of an output image of the first camera and higher than resolution of an output image of the third camera.

According to the first aspect or the second aspect, in one embodiment, the method includes: when the target zoom ratio is within (1, 3), determining the first camera and the second camera as target cameras; and respectively capturing, by using the first camera and the second camera, images that include the target scene. The method may be collaboratively performed by the obtaining module, the determining module, and the capturing module.

Compared with the third camera, the first camera and the second camera are cameras using short-focus lenses. Under a requirement of a low target zoom ratio, the first camera and the second camera are used, to respectively capture a color image and a black-and-white image, and clear imaging at a low target zoom ratio can be achieved by subsequently using methods of center cropping, multi-frame zoom, and black-and-white and color fusion. These algorithms may be performed by the image processing module.

According to the first aspect or the second aspect, in one embodiment, the method includes: when the target zoom ratio is within [3, 5], further determining whether illuminance of the target scene is lower than a preset threshold; and if the illuminance of the target scene is lower than the preset threshold, determining the second camera and the third camera as target cameras, and respectively capturing, by using the second camera and the third camera, images that include the target scene; or if the illuminance of the target scene is not lower than the preset threshold, determining the third camera as the target camera, and capturing, by using the third camera, at least one image that includes the target scene. The method may be collaboratively performed by the obtaining module, the determining module, and the capturing module.

Compared with the first camera and the second camera, the third camera is a camera using a tele-photo lens. Under a requirement of a moderate target zoom ratio, the third camera is used, to capture a color image. If the target scene has sufficient light, that is, the target scene is in a non-dark environment, lossless zoom can be approximately achieved by using methods of center cropping and multi-frame zoom. If the target scene has insufficient light, that is, the target scene is in a dark environment, the second camera needs to be enabled to capture a black image to supplement a detail for the color image captured by the third camera, and lossless zoom can be approximately achieved by using methods of center cropping, multi-frame zoom, and fusion of tele-photo, black-and-white, and color, so that clear imaging at a moderate target zoom ratio can be achieved. These algorithms may be performed by the image processing module.

According to the first aspect or the second aspect, in one embodiment, the method includes: when the target zoom ratio is within (5, 10], determining whether illuminance of the target scene is lower than a preset threshold; and if the illuminance of the target scene is lower than the preset threshold, determining the second camera and the third camera as target cameras, and respectively capturing, by using the second camera and the third camera, images that include the target scene; or if the illuminance of the target scene is not lower than the preset threshold, determining the third camera as the target camera, and capturing, by using the third camera, at least one image that includes the target scene. The method may be collaboratively performed by the obtaining module, the determining module, and the capturing module.

Compared with the first camera and the second camera, the third camera is a camera using a tele-photo lens. Under a requirement of a high target zoom ratio, the third camera is used, to capture a color image. If the target scene has sufficient light, that is, the target scene is in a non-dark environment, lossless zoom can be approximately achieved by using methods of center cropping, multi-frame zoom, and digital zoom. If the target scene has insufficient light, that is, the target scene is in a dark environment, the second camera further needs to be enabled to capture a black image to supplement a detail for the color image captured by the third camera, and a lossless zoom can be approximately achieved by using methods of center cropping, multi-frame zoom, digital zoom, and fusion of tele-photo, black-and-white, and color, so that clear imaging at a high target zoom ratio can be achieved. These algorithms may be performed by the image processing module.

According to the first aspect or the second aspect, in one embodiment, the equivalent focal length of the third camera is 3 times the equivalent focal length of the second camera, and the equivalent focal length of the second camera is equal to the equivalent focal length of the first camera.

According to the first aspect or the second aspect, in one embodiment, the equivalent focal length of the first camera is 27 mm, the equivalent focal length of the second camera is 27 mm, and the equivalent focal length of the third camera is 80 mm. In other words, the equivalent focal length of the third camera is approximately 3 times the equivalent focal length of the first/second camera.

According to the first aspect or the second aspect, in one embodiment, the resolution of the first camera, the resolution of the second camera, and the resolution of the third camera are respectively 10 M, 20 M, and 10 M.

It should be understood that different terminals may be determined based on different zoom requirements of the user, and these terminals may have lenses with different features and provide a lens combination, an image processing algorithm, and the like in different zoom conditions. That 3× and 5× are used as demarcation points in the foregoing description is one implementation thereof. More broadly, the target zoom ratio in the present disclosure may cover three ranges: a low range, a moderate range, and a high range. For ease of description, the three ranges are represented as (1, a), [a, b], and (b, c]. As cameras using short-focus lenses (for example, the equivalent focal length is 27 mm), the first camera and the second camera have a powerful short-focus imaging capability. However, as a value of the target zoom ratio increases, definition of an output image that is obtained by processing at least one image captured by the first camera and the second camera decreases, where processing algorithms include multi-frame zoom and black-and-white and color fusion. Therefore, under the constraint of the definition, a has an upper limit value, and a specific upper limit value is related to a lens parameter, an algorithm, and the user's requirement for the definition. The specific upper limit value is not listed and not limited herein. A lens parameter of the third camera is usually related to the upper limit value of a (for example, when a is 3, the equivalent focal length of the third camera may be 80 mm). To be specific, under a requirement of a moderate zoom, the first camera and the second camera already cannot satisfy an imaging requirement and in this case, a main task of capturing at least one image needs to be undertaken by a tele-photo lens, namely, the third camera. However, as the value of the target zoom ratio further increases, definition of an output image that is obtained by processing at least one image captured by the third camera also decreases, where processing algorithms include multi-frame zoom and black-and-white and color fusion. Therefore, under the constraint of the definition, b also has an upper limit value, b may be alternatively understood as an approximately lossless maximum zoom capability that can be achieved by the terminal, and a specific upper limit value is related to a lens parameter, an algorithm, and the user's requirement for the definition. The specific upper limit value is not listed and not limited herein. Manners of lens combination and image capturing for the range of (b, c] are similar to those for the range of [a, b], and except that, for the range of (b, c], an algorithm of digital zoom is added later, to achieve imaging at a high target zoom ratio, and however, an imaging quality loss already occurs. Therefore, under the functional constraint of a terminal system, a component, and the like, c has an upper limit value, c may also be understood as a maximum zoom capability that can be achieved by the terminal under a low definition requirement, and a specific upper limit value is related to a lens parameter, an algorithm, and the user's requirement for the definition. The specific upper limit value is not listed and not limited herein. According to the present disclosure, lossless zoom within the (1, b] zoom range can be achieved.

In addition, if the user allows a limited loss of definition of a zoom image, or a terminal device is allowed, due to a progress of an image processing algorithm, to use a tele-photo lens with a longer focal length (for example, a 4× tele-photo lens or a 5× tele-photo lens; to be specific, the equivalent focal length is 108 mm or 135 mm), in the foregoing embodiments, the range of the target zoom ratio, the lens parameter, and the manner of lens combination all can be adaptively adjusted based on the foregoing theory, thereby obtaining an image meeting the user's requirement. For example, the equivalent focal length of the third camera may be greater than 80 mm. These possible designs all shall fall within the protection scope of the present disclosure.

In addition, if the user allows a limited increase of noise or details of a zoom image in a light-sensitive condition, or a terminal device is allowed, due to a progress of an image processing algorithm, to use a tele-photo lens with a longer focal length (for example, a 4× tele-photo lens or a 5× tele-photo lens; to be specific, the equivalent focal length is 108 mm or 135 mm), in the foregoing embodiments, the range of the target zoom ratio, the lens parameter, and the manner of lens combination all can be adaptively adjusted based on the foregoing theory, thereby obtaining an image meeting the user's requirement. For example, the equivalent focal length of the second camera may be greater than 27 mm. These embodiments all shall fall within the protection scope of the present disclosure.

In addition, if the user allows a limited loss of definition of a zoom image, or due to a progress of an image processing algorithm, a value of b may be greater than 5, for example, may reach another value, such as 5.5× or 6×.

More specifically, the foregoing embodiments may be implemented by a processor by invoking a program and an instruction in a memory to perform corresponding operations, for example, enable a camera, control the camera to capture an image, perform algorithm processing on a captured image, and generate and store a final output image.

According to a third aspect, an embodiment of the present disclosure provides a terminal device, where the terminal device includes a memory, a processor, a bus, a first camera, a second camera, and a third camera; the memory, the first camera, the second camera, the third camera, and the processor are connected by using the bus; the first camera and the third camera are color cameras, the second camera is a black-and-white camera, and the first camera, the second camera, and the third camera all are cameras using prime lenses; and an equivalent focal length of the third camera is greater than both an equivalent focal length of the first camera and an equivalent focal length of the second camera. The camera is configured to capture an image signal under control of the processor. The memory is configured to store a computer program and an instruction. The processor is configured to invoke the computer program and the instruction stored in the memory, so that the terminal device performs the method according to any one of the foregoing embodiments.

According to the third aspect, in one embodiment, the terminal device further includes an antenna system, and the antenna system transmits and receives, under control of the processor, a wireless communication signal to implement wireless communication with a mobile communications network; and the mobile communications network includes one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network, and an LTE network.

The foregoing method, apparatus, and device may be applied to not only a scenario in which a terminal-provided shooting software performs shooting but also a scenario in which a terminal runs a third-party shooting software to perform shooting.

According to the present disclosure, an approximately 5× lossless zoom effect can be achieved on a smartphone, and a relatively good balance between resolving power and noise can also be achieved even in the dark environment.

BRIEF DESCRIPTION OF DRAWINGS

FIG. 3 shows a specific camera design manner according to an embodiment;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a terminal may be a device that provides a user with shooting and/or data connectivity, a handheld device with a wireless connection function, or another processing device connected to a wireless modem, for example, a digital camera, a single-lens reflex camera, a mobile phone (or referred to as a cellular phone), or a smartphone, or may be a portable, pocket-sized, handheld, or wearable device (for example, a smartwatch), a tablet, a personal computer (PC), a personal digital assistant (PDA), a point of sales (POS), a vehicle-mounted computer, a drone, an aerial camera, or the like.

Figure 1:
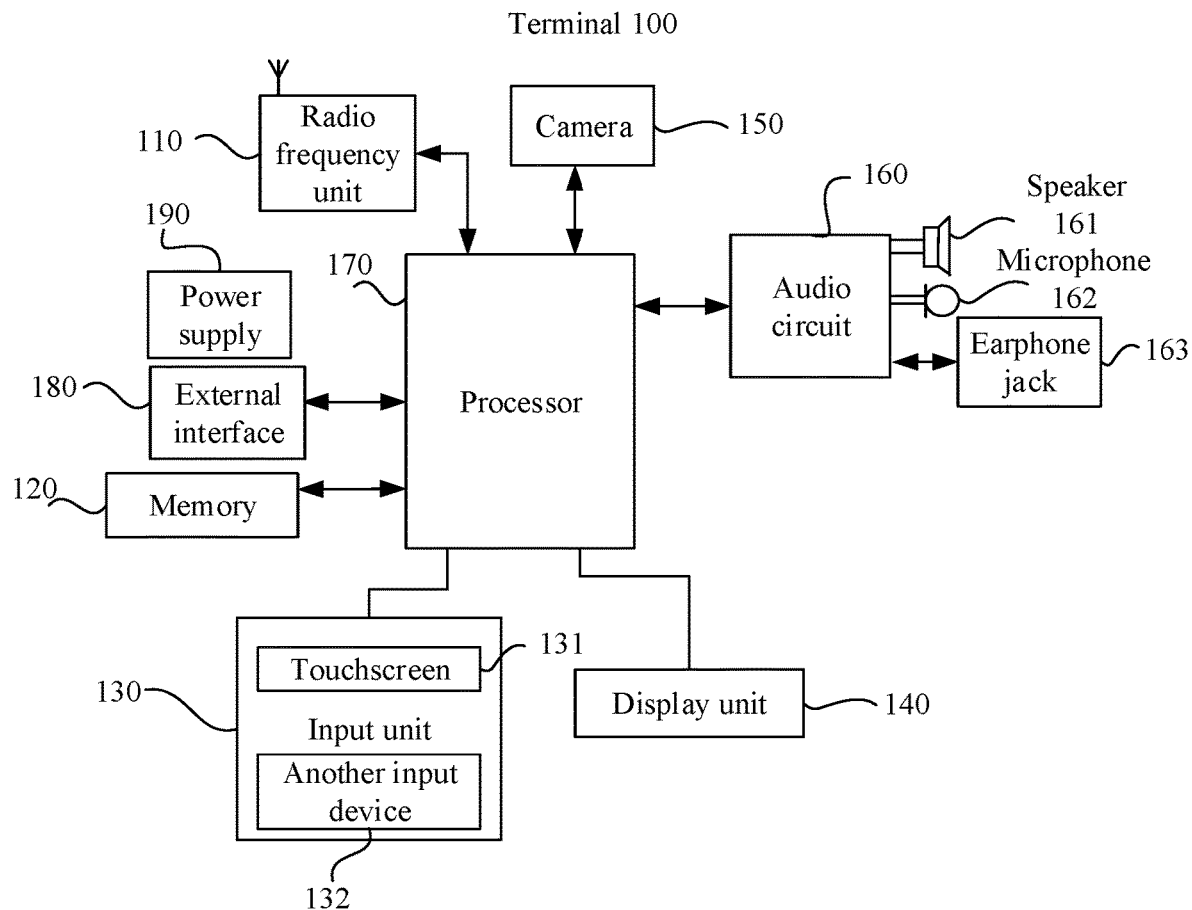
FIG. 1 is a schematic structural diagram of a terminal according to an embodiment.

FIG. 1 is an example schematic diagram of a hardware structure of a terminal 100.

As shown in FIG. 1, the terminal 100 may include components such as a radio frequency unit 110, a memory 120, an input unit 130, a display unit 140, a camera 150, an audio circuit 160, a speaker 161, a microphone 162, a processor 170, an external interface 180, and a power supply 190. In this embodiment, there are at least three cameras 150.

The camera 150 is configured to capture an image or a video, and may be triggered by using an application instruction to implement an image or video shooting function. The camera may include components such as an imaging lens, a light filter, and an image sensor. Light emitted or reflected by an object enters the imaging lens, goes through the light filter, and eventually converges on the image sensor. The imaging lens is mainly configured to perform convergence and imaging on light emitted or reflected by all objects (which may also be referred to as to-be-photographed objects) in a shooting field of view. The light filter is mainly configured to filter out an unnecessary light wave (for example, a light wave except visible light such as infrared light) in the light. The image sensor is mainly configured to perform optical-to-electrical conversion on a received optical signal to convert the optical signal into an electrical signal and input the electrical signal to the processor 170 for subsequent processing.

A person skilled in the art may understand that FIG. 1 shows merely an example of a portable multifunctional apparatus and constitutes no limitation on the portable multifunctional apparatus. The portable multifunctional apparatus may include more or fewer components than those shown in the figure, or some components may be combined, or different components may be used.

The input unit 130 may be configured to receive an input numeral or input character information, and generate a key signal input related to a user setting and function control of the portable multi-function apparatus. In one embodiment, the input unit 130 may include a touchscreen 131 and another input device 132. The touchscreen 131 may collect a touch operation performed by a user on or near the touchscreen 131 (for example, an operation performed by a user by using a finger, a knuckle, a stylus, or any other suitable object on or near the touchscreen) and drive a corresponding connection apparatus based on a preset program. The touchscreen may detect a touch action performed by the user on the touchscreen, convert the touch action into a touch signal, send the touch signal to the processor 170, receive a command sent by the processor 170, and execute the command. The touch signal includes at least coordinate information of a touch point. The touchscreen 131 may provide an input interface and an output interface between the terminal 100 and the user. In addition, the touchscreen may be implemented in various types, such as a resistor type, a capacitor type, an infrared type, and a surface acoustic wave type. In addition to the touchscreen 131, the input unit 130 may further include another input device. In one embodiment, the another input device 132 may include but is not limited to one or more of a physical keyboard, a function key (such as a volume control key and a power key), a trackball, a mouse, a joystick, and the like.

The display unit 140 may be configured to display information input by the user or information provided for the user and various menus of the terminal 100. In this embodiment, the display unit is further configured to display an image obtained by a device by using the camera 150. The image may include a preview image in some shooting modes, a shot initial image, and a target image processed by using a specific algorithm after shooting.

Further, the touchscreen 131 may cover a display panel 141. When detecting a touch operation on or near the touchscreen 131, the touchscreen 131 transmits the touch operation to the processor 170 to determine a type of a touch event, and then the processor 170 provides a corresponding visual output on the display panel 141 based on the type of the touch event. In this embodiment, the touchscreen and the display unit may be integrated into one component to implement input, output, and display functions of the terminal 100. For ease of description, in the embodiments described herein, a touch display is used to represent functions of the touchscreen and the display unit. In some embodiments, the touchscreen and the display unit may be alternatively two independent components.

The memory 120 may be configured to store an instruction and data. The memory 120 may mainly include an instruction storage area and a data storage area. The data storage area may store an association relationship between a knuckle touch gesture and an application function. The instruction storage area may store software units such as an operating system, an application, and an instruction required for at least one function, or a subset or an extended set thereof. The memory 120 may further include a nonvolatile random access memory, and provide the processor 170 with a program and an instruction for managing hardware, software, and a data resource of a computing and processing device, to support control on software and an application. The memory 120 may be further configured to store a multimedia file and store an operating program and an application.

The processor 170 is a control center of the terminal 100 and uses various interfaces and lines to connect to parts of an entire mobile phone. The processor 170 executes various functions of the terminal 100 and processes data by running or executing an instruction stored in the memory 120 and invoking data stored in the memory 120, to perform overall monitoring on the mobile phone. Optionally, the processor 170 may include one or more processing units. In one embodiment, an application processor and a modem processor may be integrated into the processor 170, where the application processor mainly processes an operating system, a user interface, an application, and the like, and the modem processor mainly processes wireless communication. It can be understood that the modem processor may not be integrated into the processor 170. In some embodiments, the processor and the memory may be implemented on a single chip. In some embodiments, alternatively, the processor and the memory may be respectively implemented on independent chips. The processor 170 may be further configured to generate a corresponding operation and control signal, send the signal to a corresponding component of the computing and processing device, and read and process data in software, especially the data and a program in the memory 120, so that each function module of the computing and processing device performs a corresponding function, to control the corresponding component to operate as required by the instruction.

The radio frequency unit 110 may be configured to transmit and receive information or transmit and receive a signal in a call process, and particularly, after receiving downlink information from a base station, send the downlink information to the processor 170 for processing; and send designed uplink data to the base station. Usually, the RF unit includes but is not limited to an antenna, at least one amplifier, a transceiver, a coupler, a low noise amplifier (LNA), a duplexer, and the like. In addition, the radio frequency unit 110 may communicate with a network device and another device through wireless communication. The wireless communication may use any communications standard or protocol, including but not limited to: global system for mobile communications (GSM), general packet radio service (GPRS) system, code division multiple access (CDMA), wideband code division multiple access (WCDMA) system, long term evolution (LTE), email, short messaging service (SMS), and the like.

The audio circuit 160, the speaker 161, and the microphone 162 may provide an audio interface between the user and the terminal 100. The audio circuit 160 may transmit an electrical signal converted from received audio data to the speaker 161, and the speaker 161 converts the electrical signal into an audio signal for outputting. In another aspect, the microphone 162 is configured to collect an audio signal and convert a received audio signal into an electrical signal. The audio circuit 160 receives the electrical signal and converts the electrical signal into audio data and then outputs the audio data to the processor 170 for processing, and the radio frequency unit 110 sends the audio data another terminal. Alternatively, the audio data is output to the memory 120 for further processing. The audio circuit may further include an earphone jack 163, configured to provide a connection interface between the audio circuit and an earphone.

The terminal 100 further includes the power supply 190 (such as a battery) that supplies power to each component. In one embodiment, the power supply may be logically connected to the processor 170 by using a power supply management system, to implement functions such as management of charging, discharging, and power consumption by using the power supply management system.

The terminal 100 further includes the external interface 180, and the external interface may be a standard Micro USB interface or a multi-pin connector. The external interface 180 may be configured to connect the terminal 100 and another device for communication, and may further connect to a charger to charge the terminal 100.

The terminal 100 may further include a flash, a wireless fidelity (WiFi) module, a Bluetooth module, sensors with different functions, and the like, which are not shown in the figure though. Details are not described herein. All methods described below can be applied to the terminal shown in FIG. 1.

Figure 2:
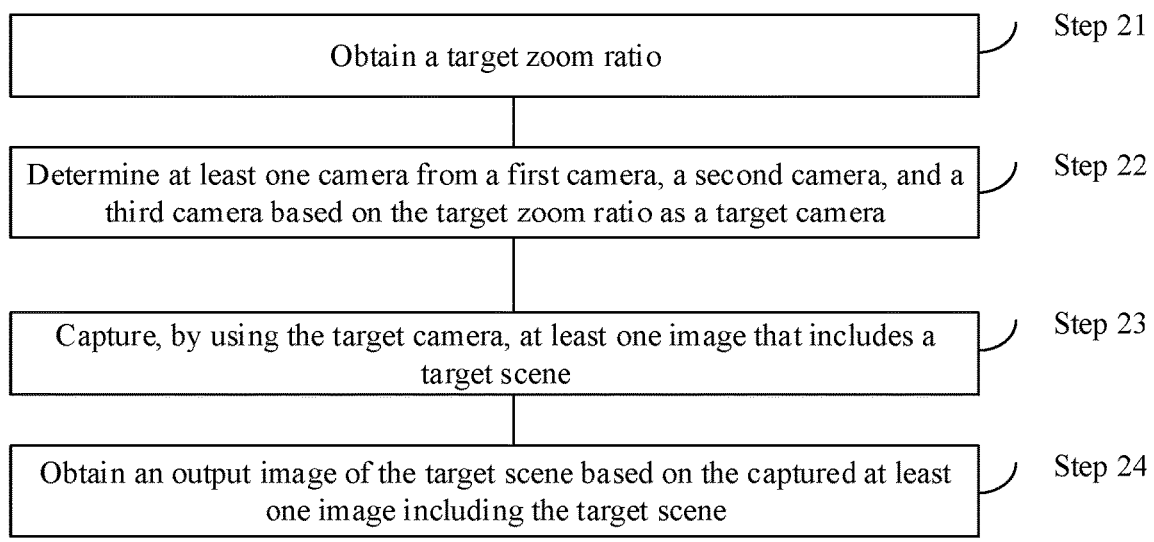
FIG. 2 is a flowchart of a shooting method according to an embodiment.

As shown in FIG. 2, an embodiment discloses a shooting method. The method is applied to a shooting terminal, and the terminal includes a first camera, a second camera, and a third camera; the first camera and the third camera are color cameras, the second camera is a black-and-white camera, resolution of the second camera is higher than resolution of the first camera and higher than resolution of the third camera, and the first camera, the second camera, and the third camera all are cameras using prime lenses; an equivalent focal length of the third camera is greater than both an equivalent focal length of the first camera and an equivalent focal length of the second camera; and the method includes the following steps:

Step 21: Obtain a target zoom ratio.

Step 22: Determine at least one camera from the first camera, the second camera, and the third camera based on the target zoom ratio as a target camera.

Step 23: Capture, by using the target camera, at least one image that includes a target scene.

Step 24: Obtain an output image of the target scene based on the captured at least one image that includes the target scene. The target scene is a scene that a user expects to shoot. Resolution of the output image is lower than the resolution of the second camera.

The foregoing three cameras may be located in the front of a terminal device or at the back of the terminal device. A specific arrangement manner of the cameras may be flexibly determined according to a requirement of a designer. This is not limited in this application.

It is a convention in the industry to convert fields of view of imaging on photosensitive elements of different sizes into a lens focal length corresponding to a same field of view of imaging on a 135 film camera (with a fixed photosensitive surface of the 135 film camera, and a 35 mm film specification). The focal length obtained through conversion is an equivalent focal length of the 135 film camera. A size of a photosensitive element (e.g., CCD or CMOS) of a digital camera varies depending on the camera (the size is, for example, 1/2.5 inch or 1/1.8 inch). Therefore, lenses of a same focal length have different imaging fields of view on digital cameras with photosensitive elements of different sizes. However, what really makes sense to the user is a shooting range (a size of a field of view) of a camera. In other words, people are more concerned with the equivalent focal length than an actual focal length.

In one embodiment, the equivalent focal length of the third camera is greater than both the equivalent focal length of the first camera and the equivalent focal length the second camera. In addition to the (27 mm, 27 mm, 80 mm) combination of the equivalent focal lengths of the first camera, the second camera, and the third camera in the foregoing example, the equivalent focal length of the first camera and the equivalent focal length of the second camera may be alternatively other values selected from 25 mm to 35 mm, and the equivalent focal length of the third camera may be 2 to 4 times the equivalent focal length of the first camera or the second camera. As a camera using a tele-photo lens, the third camera undertakes a task of obtaining a lossless zoom image under a requirement of a higher zoom when pictures obtained by the first camera and the second camera can no longer achieve lossless zoom by using an algorithm. This magnification is determined by a maximum zoom ratio that can be reached when parameters and algorithm performance of the first camera and the second camera achieve a lossless output image, and this magnification is, for example, 2.5 times, 3 times, or 3.5 times. This is merely used as an example and is not limited.

In one embodiment, an aperture of the second camera is greater than both an aperture of the first camera and an aperture of the third camera. For example, an f-number of the second camera is 1.65, an f-number of the first camera is 1.8, and an f-number of the third camera is 2.4. In another example, an f-number of the second camera is 1.55, an f-number of the first camera is 1.7, and an f-number of the third camera is 2.2. This is merely used as an example and is not limited.

In one embodiment, the resolution of the second camera is higher than the resolution of the first camera and higher than the resolution of the third camera. In addition to the (20 M, 10 M, 10 M) combination of the resolution of the second camera, the resolution of the first camera, and the resolution of the third camera in the foregoing example, the resolution of the second camera, the resolution of the first camera, and the resolution of the third camera may be, for example, a (20 M, 10 M, 8 M) combination, a (24 M, 12 M, 12 M) combination, or a (24 M, 12 M, 10 M) combination. This is merely used as an example and is not limited.

The color camera may be understood as an RGB sensor that can capture color information of the target scene and take a color photo. The black-and-white camera may be understood as a monochrome sensor that captures only a black-and-white scene. Because the monochrome sensor can capture more details from a scene, the black-and-white camera can capture details and a contour in the target scene.

It should be understood that, an imaging principle of the black-and-white camera determines that compared with a color camera of same resolution, the black-and-white camera has higher resolving power and a higher detail presentation capability. In one embodiment, when a black-and-white camera and a color camera have same resolution and a same pixel size, resolving power in a diagonal direction of an image captured by the black-and-white camera is twice resolving power in a diagonal direction of an image captured by the color camera. Further, if a black-and-white camera of higher resolution is used, for example, a ratio of output resolution of the black-and-white camera to output resolution of the color camera is T, for an output image composed by images respectively captured by using the black-and-white camera and the color camera, optical zoom capabilities in horizontal and vertical directions are increased by T times and the optical zoom capability in the diagonal direction is increased by 2T times, compared with a zoom capability of the color camera. For example, if the resolution of the color camera is 12 M (3968*2976) and the resolution of the black-and-white camera is 20 M (5120*3840), the optical zoom capability is increased by 5120/3968 times, compared with the zoom capability of the color camera. Resolution of a camera is determined by a lens design vendor and is related to manufacturing technologies and materials. In the prior art, there are a diversity of cameras of different resolution. This is merely used as an example but is not limited herein.

If both the black-and-white camera and the color camera participate in imaging, rich color information captured by the color camera may be fused with clear details captured by the black-and-white camera to obtain a higher-quality photo.

In one embodiment, in step 21, the obtaining a target zoom ratio means obtaining a magnification selected by the user, for example, 1.5× zoom (1.5×), 2× zoom (2×), and 3× zoom (3×). A preset field of view may be used as a reference of a target zoom ratio, and the preset field of view may be flexibly selected by the user or the designer, for example, a 78-degree FOV is used as a reference. A value of the target zoom ratio is denoted as n. For example, if adjustable precision of a focal length of a camera is 0.1, nx may be 1.1×, 1.2×, or 1.3×, or if the adjustable precision is 0.5, nx may be 1.5×, 2.0×, 2.5×, or the like.

It should be understood that the user may select a zoom ratio by using a zoom ratio button on a shooting device or by entering a gesture command on a display screen of the shooting device. Alternatively, the zoom ratio may be determined by a system based on the user's input on a specific position.

Further, when the user presses a shooting button of the shooting device or receives the gesture command entered on the screen of the shooting device, that is, a shutter is triggered, a target camera captures the image that includes the target scene. In one embodiment, the target camera may capture at least one image in an exposure time, and the terminal processes the captured pictures to obtain the output image of the target scene.

It should be understood that, the target scene is a scene that the user expects to shoot, and a preview image obtained when a camera system is adjusted to apply the target zoom ratio is the user's most intuitive perception of the target scene. However, all the cameras provided in the present disclosure are cameras using prime lenses. If a shooting distance of a camera using a prime lens is fixed, a shot vision is fixed; therefore, an image actually captured by the target camera has a larger vision than the target scene, that is, the image that includes the target scene is captured.

With reference to FIG. 2, FIG. 3 shows a relatively specific camera design manner according to an embodiment. The design includes three cameras using prime lenses. With reference to different features of the three cameras, at different zoom ratios, at least one camera is selectively enabled to capture an image, and image processing is performed on the captured image to achieve an approximately 5× lossless zoom. In brief, for an image shot by a camera at a zoom of nx and an image shot at a distance of 1/n from an object without a zoom, if details and definition of two images are equivalent, the zoom of nx is referred to as lossless zoom. An optical zoom is usually used as a benchmark, and the optical zoom is considered to be lossless; therefore, if an effect of a zoom is similar to that of the optical zoom, the zoom may be referred to as the lossless zoom. There are some objective tests that may be used to measure a resolving capability and definition of an image, for example, the Siemens star chart provided by the company Image Engineering (IE).

Embodiments of the present disclosure may be implemented in a mobile portable terminal or a smart shooting terminal, such as a mobile phone or a tablet. The user enters a zoom mode and selects a zoom ratio, a camera that needs to be enabled is determined by a shooting system in the terminal based on the user's zoom ratio and a preset camera combination mode. The enabled camera is used, to consecutively shoot a plurality of frames of images (if there are a plurality of enabled cameras, the plurality of cameras synchronously perform shooting), and a clear zoom image is obtained from the shot multi-frame image by using a preset corresponding algorithm.

Based on FIG. 3, the following uses specific examples to describe, based on cases, different shooting manners and image processing manners provided herein at different target zoom ratios, where specific parameters of the first camera may be as follows:

27-mm equivalent focal length, color camera, and 10 M resolution;

specific parameters of the second camera may be as follows:

27-mm equivalent focal length, black-and-white camera, and 20 M resolution; and specific parameters of the third camera may be as follows:
80-mm equivalent focal length, color camera, 10 M resolution.

Case 1

Figure 4:
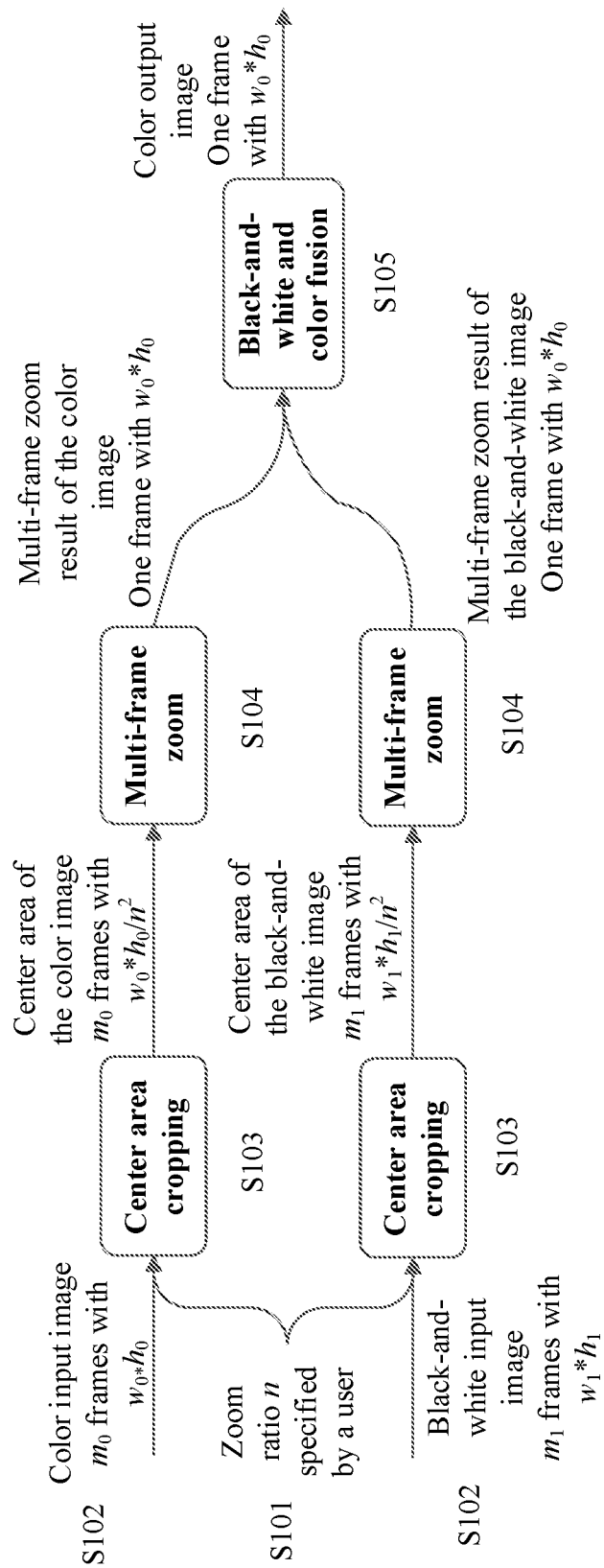
FIG. 4 shows a shooting manner of a first optional case according to an embodiment.

Reference may be made to FIG. 4.

S101. When the target zoom ratio is within a range of 1× to 3×, the terminal enables the first camera and the second camera.

When the user adjusts a camera parameter, once a target zoom ratio set by the user is within an interval (1, 3), the terminal enables the first camera (e.g., a primary camera) and the second camera (e.g., a secondary camera). In this case, the preview image changes correspondingly, and the preview image is an image of a target scene that the user expects to shoot. The first camera is a primary camera and the second camera is a secondary camera; therefore, the preview image is a part of an image actually captured by the first camera and a size of the part is determined by both the target zoom ratio and a preset length-to-width ratio (for example, 4:3 or 16:9) of the output image. It should be understood that images actually captured by the first camera and the second camera are different from image content of an actual preview image (this also applies to the third camera in the following description). The images actually captured by the first camera and the second camera may be not visible to the user. The preview image is the user's intuitive perception of the target scene that the user expects to shoot and a most intuitive representation of the target zoom ratio.

For ease of description, a width of an image actually shot by the first camera is denoted as $w_0$, a height thereof is denoted as $h_0$, and the resolution of the first camera is $w_0*h_0$; and a width of an image actually shot by the second camera is denoted as $w_1$, a height thereof is denoted as $h_1$, and the resolution of the first camera is $w_1*h_1$. Because resolution of the first camera and resolution of the second camera are determinate, $w_0$, $h_0$, $w_1$, and $h_1$ may be considered as constants.

In one case, if $w_0$ and $h_0$ match the preset length-to-width ratio of the output image, a width and height of a final output image are also $w_0$ and $h_0$. In another case, if $w_0$ and $h_0$ do not match the preset length-to-width ratio of the output image, and a width and height of a final output image are $w_0'$ and $h_0'$, the camera system needs to crop an actually captured image of $w_0*h_0$ to an image of $w_0'*h_0'$ before subsequent image processing is performed. It should be understood that, for ease of the following algorithm description, the five examples of Cases 1 to 5 are all described based on a previous case. A next case may be derived by a person skilled in the art by using ordinary mathematical knowledge. Details are not described herein.

S102. When a shooting function is triggered, the first camera and the second camera respectively perform consecutive shooting on their respective actually captured scenes, to respectively obtain $m_0$ frames of color images and $m_1$ frames of black-and-white images, where $m_0$ and $m_1$ are positive integers and $m_0$ may be equal to $m_1$. A value relationship between $m_0$ and $m_1$ and specific values of $m_0$ and $m_1$ are not limited in the present disclosure. In an implementation, values of $m_0$ and $m_1$ may be 4, 6, or the like, the $m_0$ frames of color images may be consecutive or inconsecutive in a time sequence, and the $m_1$ frames of black-and-white images may also be consecutive or inconsecutive in the time sequence.

In one embodiment, $m_0$ or $m_1$ may be 1, but in this case, a subsequent multi-frame zoom operation does not apply, that is, after subsequent S103 is performed, an operation of black-and-white and color fusion in S105 is directly performed. However, $m_0$ or $m_1$ usually should be greater than 1, and in this case, the subsequent multi-frame zoom operation applies, that is, subsequent S103, S104, and S105 are performed.

It should be understood that the first camera and the second camera are cameras using prime lenses; therefore, an actually shot image further includes other content different from the preview image instead of including only a zoom target scene that the user expects to shoot and that is visible to the user in the preview image.

S103. Perform center area cropping (also briefly referred to as center cropping) on the $m_0$ frames of color images to crop $m_0$ frames of color images with a size of $w_0*h_0/n^2$ from images actually shot by the first camera. Perform center area cropping on the $m_1$ frames of black-and-white images, to crop $m_1$ frames of black-and-white images with a size of $w_1*h_1/n^2$ from images actually shot by the second camera.

The center area cropping may be understood as cropping an area that the user expects to shoot, that is, cropping a valid area of a specified size while ensuring that a center of an input image remains unchanged. The cropped area is determined by both a target zoom ratio specified by the user and an equivalent focal length of the camera.

Therefore, in terms of the user's intuitive perception, the target scene may narrowly mean a preview image at the target zoom ratio or broadly mean an area cropped out of a center area.

S104. Perform multi-frame zoom on the $m_0$ frames of color images with a size of $w_0*h_0/n^2$ to obtain a color multi-frame zoom result, namely, one frame of color zoom image of $w_0*h_0/n^2$. Perform multi-frame zoom on the $m_1$ frames of black-and-white images with a size of $w_1*h_1/n^2$ to obtain a black-and-white multi-frame zoom result, namely, one frame of black-and-white zoom image of $w_1*h_1/n^2$.

Figure 5:
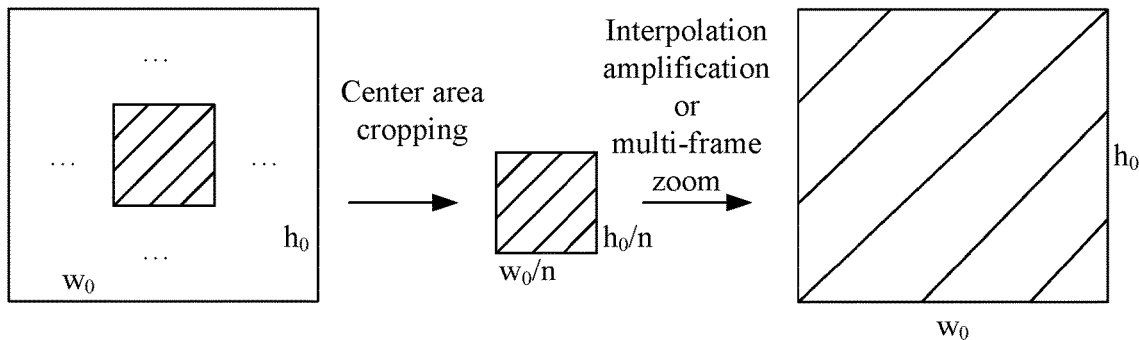
FIG. 5 shows a change process of a target scene from an actually captured image to an output image according to an embodiment.

The target scene is cropped out from an actually captured image and one frame of image of a target scene is obtained by using multi-frame zoom. For an image area of the target scene and a size change, refer to FIG. 5.

In one embodiment, jitter inevitably occurs because the shooting device is held by the user during shooting. Therefore, a plurality of frames of images inevitably have different image content, and different frames of images of a same object in a target scene slightly differ in definition. Therefore, information sampled from positions of the plurality of frames of images may be used to complement each other to fuse into one frame of image with a higher resolving capability, higher definition, and lower noise.

In one embodiment, a multi-frame zoom algorithm procedure is as follows:

(1) Select a reference frame. Common methods include: selecting frame 1, selecting a frame shot at an intermediate moment, or selecting a clearest frame. For example, a clearer frame of the first two frames may be selected as the reference frame.

(2) Align each of other frames of input images to the reference frame, perform motion compensation on aligned images based on the reference frame, and then perform step (3) or step (4).

(3) Perform interpolation amplification, by using a method such as bicubic or Lanczos, on a plurality of frames of motion-compensated images, to change a size of an image of the center area from $w_0*h_0/n^2$ to $w_0*h_0$, while ensuring that image content of the center area remains unchanged. This step is optional in some embodiments.

(4) Input a plurality of frames of images obtained in step (2) to a pre-trained convolutional neural network to obtain one frame of zoomed image, change the size of the image of the center area from $w_0*h_0/n^2$ to $w_0*h_0$, while ensuring that the image content of the center area remains unchanged. Alternatively, input a plurality of frames of images obtained in step (3) to another pre-trained convolutional neural network to obtain one frame of zoomed image, where the size of the image is $w_0*h_0$.

In the foregoing procedure, the motion compensation, the interpolation amplification, the convolutional neural network, and the like may be implemented in many manners. A multi-frame zoom algorithm may also be implemented in various manners and the algorithm is not limited in the present disclosure. A person skilled in the art should understand that there are many open-source algorithms that may be invoked to implement the foregoing procedure, and therefore details are not described herein.

S105. Perform black-and-white and color fusion on the frame of color zoom image and the frame of black-and-white zoom image obtained in S104, to obtain one frame of color output image of $w_0*h_0$, namely, an output image of the target scene, which is an image that can be saved by the user. Herein, the resolution of the output image of the target scene is the same as the resolution of the first camera and the resolution of the third camera.

In one embodiment, a procedure of a black-and-white and color fusion algorithm is as follows:

Algorithm procedure:

(1) Select a fusion branch based on factors such as a distance from a scene. For example, color information may be fused on a basis of black-and-white. Alternatively, a high frequency of black-and-white is fused on a basis of color information.

(2) Align a black-and-white image to a color image by using a method of combining global registration with local block matching.

(3) Perform information fusion, based on the selected branch in step (1), on a black-and-white image and a color image that are aligned, to obtain a fused result.

(4) Sharpen the fused result.

In the foregoing algorithm procedure, related processing manners may use mature algorithms in the prior art, such as fusion, alignment, and sharpening, which are not limited and not described in the present disclosure.

As described above, both the black-and-white camera and the color camera participate in imaging, rich color information captured by the color camera is fused with clear details captured by the black-and-white camera, to obtain a higher-quality photo.

Case 2

Figure 6:
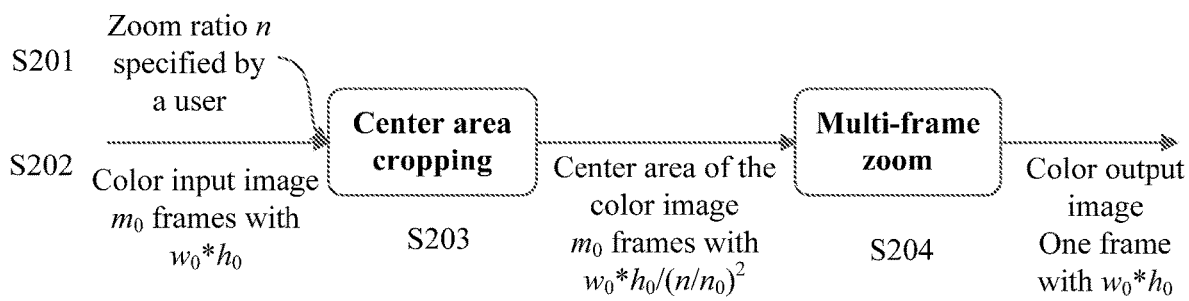
FIG. 6 shows a shooting manner of a second optional case according to an embodiment.

Reference may be made to FIG. 6.

S201. When the target zoom ratio is within a range of 3× to 5×, the system needs to determine whether the target scene is in a dark environment. If the target scene is not in the dark environment, the terminal enables the third camera.

The dark environment may be determined based on whether a preset condition is met. If a light condition is lower than 100 lux, the target scene is considered to be in the dark environment; and if a light condition is 100 lux, the target scene is considered to be not in the dark environment. This preset illuminance value is determined by the user or the terminal design vendor, which is not limited in the present disclosure. In a specific implementation process, the terminal may perform the determining by using an ISO value used during normal exposure. If the ISO value is greater than or equal to 400, the target scene is considered to be in the dark environment; or if the ISO value is smaller than 400, the target scene is considered to be in a non-dark environment. A preset ISO value is determined by the user or the terminal design manufacturer, which is not limited herein.

When the user adjusts a camera parameter, once a target zoom ratio set by the user is within an interval [3, 5], the third camera is enabled. In this case, the preview image changes correspondingly, and the preview image is a part of an image actually captured by the third camera. A size of the part is determined by both the target zoom ratio and a preset length-to-width ratio of the output image.

S202. When a shooting function is triggered, the third camera performs consecutive shooting on an actually captured scene, to obtain and $m_2$ frames of color images.

A width of an image shot by the third camera is denoted as $w_2$, a height thereof is denoted as $h_2$, and the resolution of the third camera is $w_2*h_2$. Because the resolution of the third camera is the same as the resolution of the first camera, $w_2=w_0$, and $h_2=h_0$. In addition, $m_2$ may be the same as $m_0$, and remaining steps and accompanying drawings may be alternatively expressed by using $w_0$, $h_0$, and $m_0$.

S203. Perform center area cropping on the $m_0$ frames of color images to crop $m_0$ frames of color images with a size of $w_0*h_0/(n/n_0)^2$ from images actually shot by the third camera. The equivalent focal length of the third camera is 80 mm, that is, the third camera is a camera using a tele-photo lens, and compared with a camera using a standard lens, an image shot at a same shooting distance by the third camera is larger but a vision is smaller. Therefore, the center area is determined by both the target zoom ratio and the equivalent focal length. Herein, $n_0$ is approximately equal to 3 (80 mm/27 mm) and is determined by the equivalent focal length of the camera.

S204. Perform multi-frame zoom on the $m_0$ frames of color images with a size of $w_0*h_0/(n/n_0)^2$ to obtain a color multi-frame zoom result, namely, one frame of color zoom image of $w_0*h_0$, which is an output image of the target scene and is also an image that can be saved by the user. Herein, the resolution of the output image of the target scene is the same as the resolution of the first camera and the resolution of the third camera.

For a multi-frame zoom algorithm in S204, refer to the multi-frame zoom algorithm in S104.

Case 3

Figure 7:
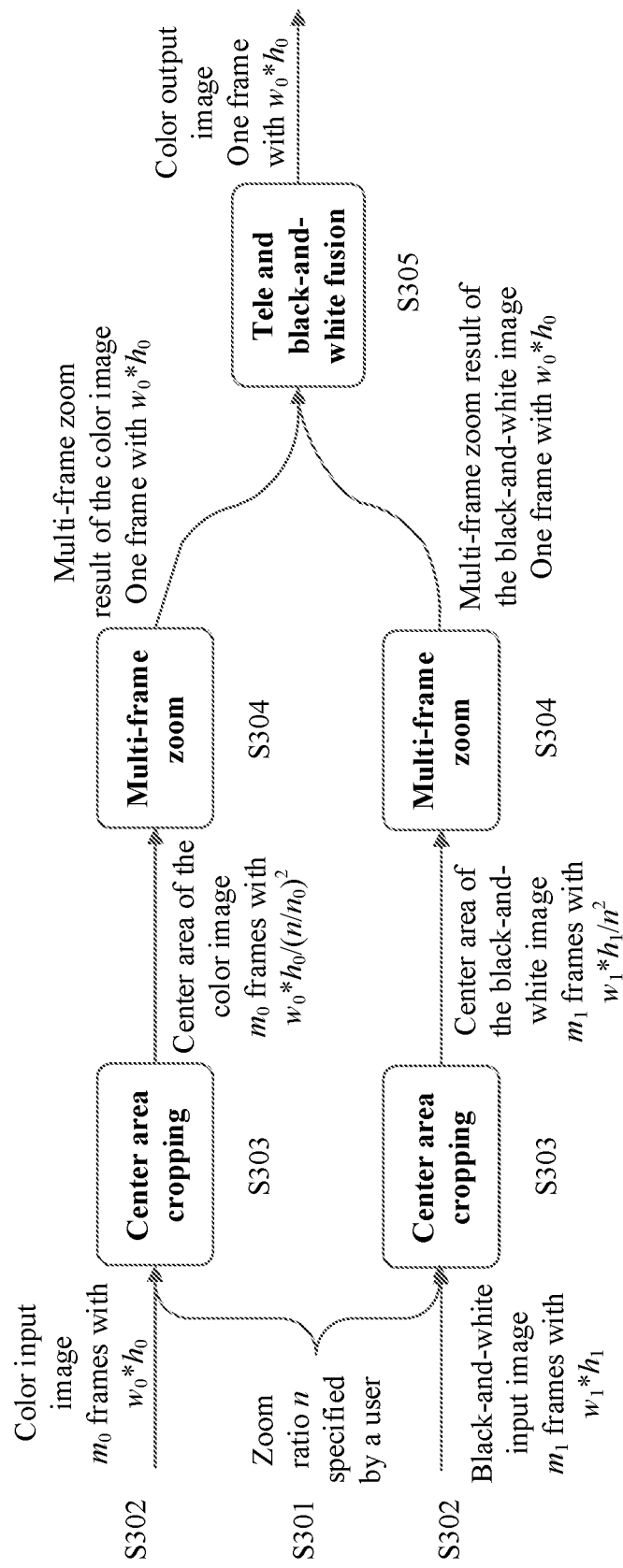
FIG. 7 shows a shooting manner of a third optional case according to an embodiment.

Reference may be made to FIG. 7.

S301. When the target zoom ratio is within a range of 3× to 5×, the system needs to determine whether the target scene is in a dark environment. If the target scene is in the dark environment, the terminal enables the second camera and the third camera. For the determining of the dark environment, refer to S201.

When the user adjusts a camera parameter, once a target zoom ratio set by the user is within an interval [3, 5], the third camera (e.g., a primary camera) and the second camera (e.g., a secondary camera) are enabled. In this case, the preview image changes correspondingly, and the preview image is a part of an image actually captured by the third camera. A size of the part is determined by both the target zoom ratio and a preset length-to-width ratio of the output image.

S302. When a shooting function is triggered, the third camera and the second camera respectively perform consecutive shooting on their respective actually captured scenes, to respectively obtain $m_2$ frames of color images and $m_1$ frames of black-and-white images.

A width of an image actually shot by the third camera is denoted as $w_2$, a height thereof is denoted as $h_2$, and the resolution of the third camera is $w_2*h_2$. Because the resolution of the third camera is the same as the resolution of the first camera, $w_2=w_0$, and $h_2=h_0$. In addition, $m_2$ may be the same as $m_0$, and remaining steps and accompanying drawings may be alternatively expressed by using $w_0$, $h_0$, and $m_0$.

A width of an image actually shot by the second camera is denoted as $w_1$, a height thereof is denoted as $h_1$, and the resolution of the second camera is $w_1*h_1$.

It should be understood that the third camera and the second camera are cameras using prime lenses; therefore, an actually shot image further includes other content different from the preview image instead of including only a zoom target scene that the user expects to shoot and that is visible to the user in the preview image.

S303. Perform center area cropping on the $m_0$ frames of color images to crop $m_0$ frames of color images with a size of $w_0*h_0/(n/n_0)^2$ from images actually shot by the third camera. Perform center area cropping on the $m_1$ frames of black-and-white images to crop $m_1$ frames of black-and-white images with a size of $w_1*h_1/n^2$ from images actually shot by the second camera. Herein, $n_0$ is approximately equal to 3.

S304. Perform multi-frame zoom on the $m_0$ frames of color images with a size of $w_0*h_0/(n/n_0)^2$ obtained in S303, to obtain a color multi-frame zoom result, namely, one frame of color zoom image of $w_0*h_0$. Perform multi-frame zoom on the $m_1$ frames of black-and-white images with a size of $w_1*h_1/n^2$ obtained in S303, to obtain a black-and-white multi-frame zoom result, namely, one frame of black-and-white zoom image of $w_1*h_1/n^2$.

For a multi-frame zoom algorithm in S304, refer to the multi-frame zoom algorithm in S104.

S305. Perform tele-photo and black-and-white fusion on the frame of color zoom image of $w_0*h_0$ and the frame of black-and-white zoom image of $w_0*h_0/n^2$ obtained in S304, to obtain one frame of color output image of $w_0*h_0$, namely, an output image of the target scene. Herein, the resolution of the output image of the target scene is the same as the resolution of the first camera and the resolution of the third camera.

In one embodiment, a procedure of an algorithm of the tele-photo and black-and-white fusion is as follows:

(1) Use a color zoom image (which may be referred to as a telephoto) corresponding to a tele-photo lens as a reference, align a black-and-white zoom image to the telephoto, to obtain a motion area mask.

(2) Input the telephoto, an aligned black-and-white image, and the motion area mask to a pre-trained convolutional neural network to obtain a fused result.

(3) Sharpen the result fused in step (2).

The tele-photo and black-and-white fusion is used, that is, advantages of a higher resolving capability and higher definition of the telephoto are used, and an advantage of lower noise of the black-and-white image is further used, thereby ensuring image quality of a high zoom ratio scene in the dark environment, and almost achieving a lossless level.

In the foregoing algorithm procedure, related processing manners may use mature algorithms in the prior art, such as fusion, alignment, and sharpening, which are not limited and described herein.

Case 4

Figure 8:
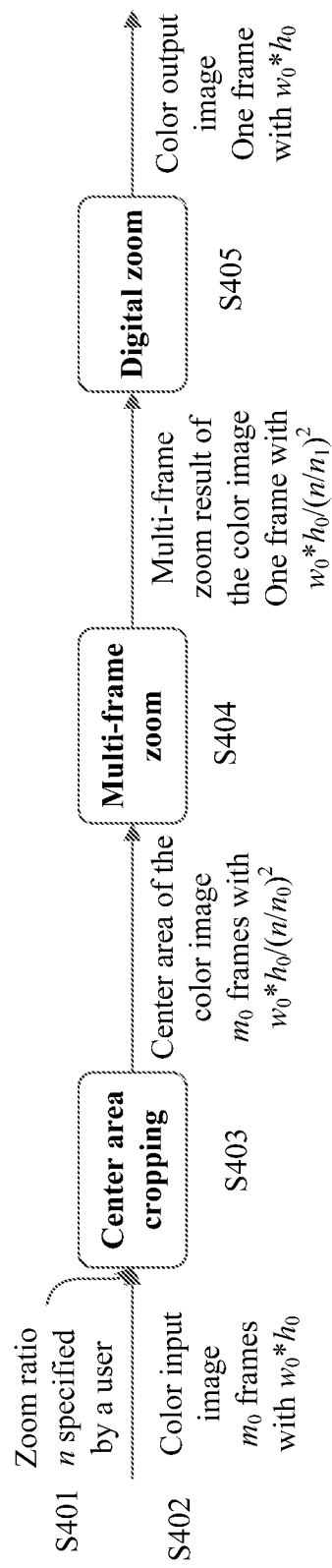
FIG. 8 shows a shooting manner of a fourth optional case according to an embodiment.

Reference may be made to FIG. 8.

S401. When the target zoom ratio is within a range of 5× to 10×, the system needs to determine whether the target scene is in a dark environment. If the target scene is not in the dark environment, the terminal enables the third camera. For the determining of the dark environment, refer to S201.

When the user adjusts a camera parameter, once a target zoom ratio set by the user is within an interval (5, 10], the third camera is enabled. In this case, the preview image changes correspondingly, and the preview image is a part of an image actually captured by the third camera. A size of the part is determined by both the target zoom ratio and a preset length-to-width ratio of the output image.

S402. When a shooting function is triggered, the third camera performs consecutive shooting on an actually captured scene, to obtain $m_2$ frames of color images.

A width of an image shot by the third camera is denoted as $w_2$, a height thereof is denoted as $h_2$, and the resolution of the third camera is $w_2*h_2$. Because the resolution of the third camera is the same as the resolution of the first camera, $w_2=w_0$, and $h_2=h_0$. In addition, $m_2$ may be the same as $m_0$, and remaining steps and accompanying drawings may be alternatively expressed by using $w_0$, $h_0$, and $m_0$.

S403. Perform center area cropping on the $m_0$ frames of color images to crop $m_0$ frames of color images with a size of $w_0*h_0/(n/n_0)^2$ from images actually shot by the third camera. The equivalent focal length of the third camera is 80 mm, that is, the third camera is a camera using a tele-photo lens, and compared with a camera using a standard lens, an image shot at a same shooting distance is larger. Therefore, the center area is determined by both the target zoom ratio and the equivalent focal length. Herein, $n_0$ is approximately equal to 3 (80 mm/27 mm).

S404. Perform multi-frame zoom on the $m_0$ frames of color images with a size of $w_0*h_0/(n/n_0)^2$ to obtain a color multi-frame zoom result, namely, one frame of color zoom image of $w_0*h_0/(n/n_1)^2$. Herein, $n_1$ is a lossless zoom capability of a shooting system of the terminal, namely, a maximum zoom ratio under a lossless condition, for example, 5× in this example. Herein, $n_1$ is determined by parameter performance of the entire shooting system of the terminal, and may be considered as a constant.

For a multi-frame zoom algorithm in S404, refer to the multi-frame zoom algorithm in S104.

S405. Perform digital zoom on the frame of color zoom image of $w_0*h_0/(n/n_1)^2$ obtained in S404, to obtain one frame of color zoom image of $w_0*h_0$, namely, an output image of the target scene. Herein, the resolution of the output image of the target scene is the same as the resolution of the first camera or the resolution of the third camera.

There are many methods for the digital zoom, for example, interpolation amplification, and common methods for the interpolation amplification include bilinear, bicubic, Lanczos, and the like. The digital zoom can be used only to zoom in resolution of an image to a target resolution, but cannot ensure definition and a resolving capability of the image. Therefore, compared with the lossless zoom, the digital zoom is considered as a zoom with a particular loss, but also indicates a particular imaging capability of a camera.

Case 5

Figure 9:
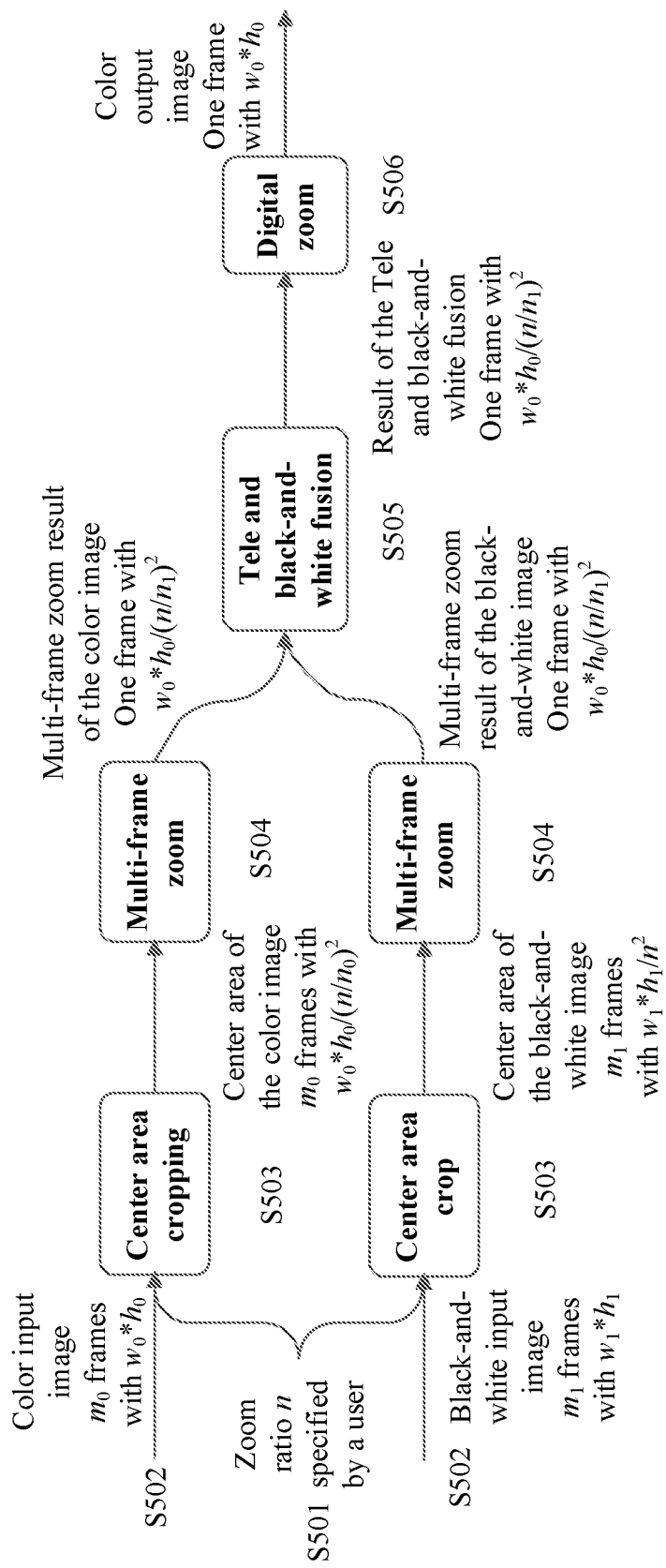
FIG. 9 shows a shooting manner of a fifth optional case according to an embodiment.

Reference may be made to FIG. 9.

S501. When the target zoom ratio is within a range of 5× to 10×, the system needs to determine whether the target scene is in a dark environment. If the target scene is in the dark environment, the terminal enables the second camera and the third camera. For the determining of the dark environment, refer to S201.

When the user adjusts a camera parameter, once a target zoom ratio set by the user is within an interval (5, 10], the third camera (e.g., a primary camera) and the second camera (e.g., a secondary camera) are enabled. In this case, the preview image changes correspondingly, and the preview image is a part of an image actually captured by the third camera. A size of the part is determined by both the target zoom ratio and a preset length-to-width ratio of the output image.

S502. When a shooting function is triggered, the third camera and the second camera respectively perform consecutive shooting on their respective actually captured scenes, to respectively obtain $m_2$ frames of color images and $m_1$ frames of black-and-white images.

A width of an image actually shot by the third camera is denoted as $w_2$, a height thereof is denoted as $h_2$, and the resolution of the third camera is $w_2*h_2$. Because the resolution of the third camera is the same as the resolution of the first camera, $w_2=w_0$, and $h_2=h_0$. In addition, $m_2$ may be the same as $m_0$, and remaining steps and accompanying drawings may be alternatively expressed by using $w_0$, $h_0$, and $m_0$.

A width of an image actually shot by the second camera is denoted as $w_1$, a height thereof is denoted as $h_1$, and the resolution of the second camera is $w_1*h_1$.

It should be understood that the third camera and the second camera are cameras using prime lenses; therefore, an actually shot image further includes other content different from the preview image instead of including only a zoom target scene that the user expects to shoot and that is visible to the user in the preview image.

S503. Perform center area cropping on the $m_0$ frames of color images to crop $m_0$ frames of color images with a size of $w_0*h_0/(n/n_0)^2$ from images actually shot by the third camera. Perform center area cropping on the $m_1$ frames of black-and-white images to obtain $m_1$ frame of black-and-white images with a size of $w_1*h_1/n^2$ from images actually shot by the second camera. Herein, $n_0$ is approximately equal to 3.

S504. Perform multi-frame zoom on the $m_0$ frames of color images with a size of $w_0*h_0/(n/n_0)^2$ obtained in S503, to obtain a color multi-frame zoom result, namely, one frame of color zoom image of $w_0*h_0/(n/n_1)^2$. Perform multi-frame zoom on the $m_1$ frames of black-and-white images with a size of $w_0*h_0/n^2$ obtained in S503, to obtain a black-and-white multi-frame zoom result, namely, one frame of black-and-white zoom image of $w_0*h_0/(n/n_1)^2$.

For a multi-frame zoom algorithm in S504, refer to the multi-frame zoom algorithm in S104.

S505. Perform tele-photo (Tele-photo) and black-and-white fusion on the frame of color zoom image of $w_0*h_0/(n/n_1)^2$ and the frame of black-and-white zoom image of $w_0*h_0/(n/n_1)^2$ obtained in S504, to obtain one frame of color zoom image of $w_0*h_0/(n/n_1)^2$. Herein, $n_1$ is a lossless zoom capability of a shooting system of the terminal, namely, a maximum zoom ratio under a lossless condition, for example, 5×. Herein, $n_1$ is determined by parameter performance of the entire shooting system of the terminal, and may be considered as a constant.

S506. Perform digital zoom on the frame of color zoom image of $w_0*h_0/(n/n_1)^2$ obtained in S505, to obtain one frame of color zoom image of $w_0*h_0$, namely, an output image of the target scene. Herein, the resolution of the output image of the target scene is the same as the resolution of the first camera and the resolution of the third camera.

An algorithm of the digital zoom is a mature technology in the prior art, and reference may be made to S405.

It should be understood that the foregoing five cases are merely example embodiments, and the specific parameters mentioned above vary with design of a parameter of a camera, an algorithm implementation, a user setting, an operating system of the terminal, and an environment of the terminal. In addition, expressions of some parameters vary with criteria of different references. Settings of the specific parameters cannot be all listed. A person skilled in the art should understand that the present disclosure is intended to correspondingly use, according to the user's different zoom requirements, different lens combination manners to obtain pictures, obtain a final picture according to a corresponding algorithm, and achieve lossless imaging quality within an entire large zoom range of 1× to 5×. If a maximum target zoom ratio under a lossless condition is appropriately adjusted, a person skilled in the art may follow the lens combination manners according to the embodiments of the present disclosure and adaptively change the lens parameter, or use different types of algorithms to achieve approximate lossless zoom. If the user allows a limited loss of definition of a zoom image, or the terminal device allows using a larger tele-photo lens, the zoom ranges and the lens combinations in the foregoing embodiments may be all correspondingly adjusted, based on the foregoing theory, to obtain an image that meets the user's requirement. These variant technical solutions shall fall within the protection scope of the present disclosure.

It should be further understood that, in a process of use by the user, due to the user's actual requirement, different zoom ranges are continuously used in a short period of time during a process of focusing. A change of these zoom ranges directly causes a change in enabling of the camera. The foregoing five cases are used as an example; for a specific enabling status of each camera, refer to statuses of the three cameras within different zoom ranges in FIG. 3. For example, initially, when the target zoom ratio is 1.5, the first camera and the second camera are enabled, and the third camera is disabled. When the target zoom ratio is adjusted from 1.5 to 3.5 and the target scene is in the dark environment, the third camera and the second camera are enabled, and the first camera is disabled.

It should be further understood that in the foregoing embodiments, the resolution of the output image is the same as the resolution of the first camera or the resolution of the third camera and is lower than the resolution of the second camera. Actually, the resolution of the output image should meet the user's requirement for definition, and is not necessarily equal to the resolution of the first camera or the resolution of the third camera. Usually, the first camera or the third camera represents most basic imaging performance of the shooting terminal in different shooting modes. Therefore, maximum resolution of the output image is roughly equal to the resolution of the first camera or the resolution of the third camera. Usually, during delivery of a terminal, the maximum resolution of the output image is basically determined, and the user may set the resolution of the output image in the camera system according to the user's requirement.

In addition, in one embodiment, the shooting system is further configured to adjust an imaging parameter of an optical zoom module according to a zoom mode of the target scene. The imaging parameter includes at least one of the following: a noise reduction parameter, a sharpening parameter, or contrast, to control noise reduction, sharpening, contrast, and a dynamic range of an image during an intermediate process. For example, in a bright scene, an ISP module is controlled to disable a noise reduction and sharpening module, and in a low-illuminance scenario, the ISP module is controlled to enable the noise reduction and sharpening module and adjust the parameter to an appropriate level. In addition, because the parameters of the contrast and the dynamic range in the zoom mode are different from those in a common shooting mode, the parameters of the contrast and the dynamic range may be adjusted in a customized manner in different zoom modes. Therefore, according to the methods in the embodiments of the present disclosure, the imaging parameter may be configured according to different scenarios, to ensure imaging quality of a final image.

In some embodiments, an approximately 5× lossless zoom effect can be achieved on a smartphone, and a relatively good balance between a resolving capability and noise can also be achieved even in the dark environment. Using a combination of a plurality of cameras using prime lenses instead of a functional device of a large size does not significantly increase thickness of the terminal, thereby ensuring aesthetics of the terminal, especially for a smart handheld device such as a mobile phone, satisfying the user's requirements for a small-size low-profile terminal and lossless imaging at a large zoom, and improving use experience of the user.

Figure 10:
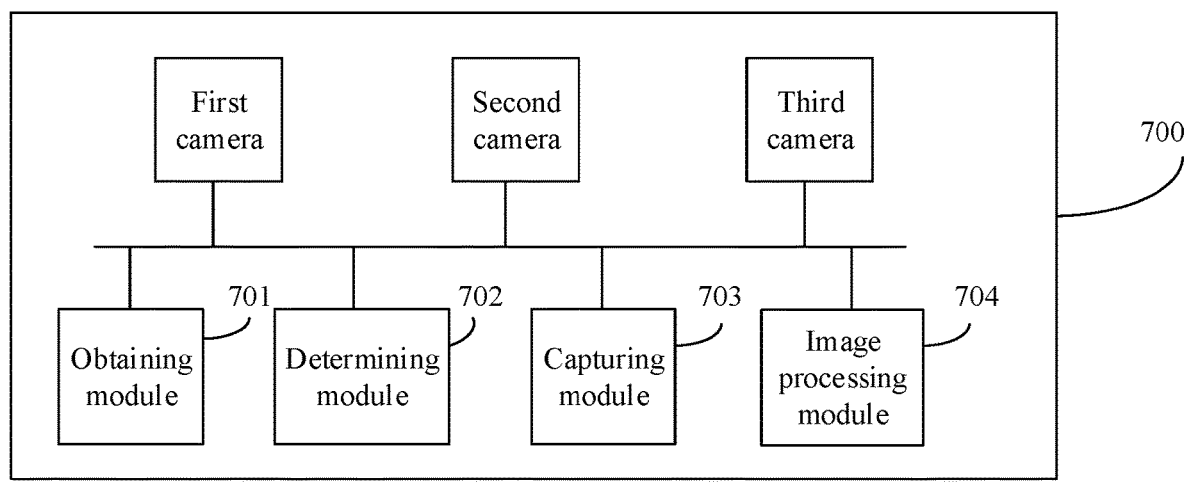
FIG. 10 is a schematic structural diagram of a shooting apparatus according to an embodiment.

Based on the shooting method provided in the foregoing embodiment, an embodiment of the present disclosure provides a shooting apparatus 700, and the apparatus 700 may be applied to various shooting devices. As shown in FIG. 10, the apparatus 700 includes an obtaining module 701, a determining module 702, a capturing module 703, an image processing module 704, a first camera, a second camera, and a third camera; the first camera and the third camera are color cameras, the second camera is a black-and-white camera, and resolution of the second camera is higher than resolution of the first camera and higher than resolution of the third camera, and the first camera, the second camera, and the third camera all are cameras using prime lenses; and an equivalent focal length of the third camera is greater than both an equivalent focal length of the first camera and an equivalent focal length of the second camera. For related features, refer to the description in the foregoing method embodiment.

The obtaining module 701 is configured to obtain a target zoom ratio, and the obtaining module 701 may be obtained by a processor invoking a corresponding program instruction based on an input of the outside.

The determining module 702 is configured to determine at least one camera from the first camera, the second camera, and the third camera based on the target zoom ratio as a target camera, and the determining module 702 may selectively enable the foregoing three cameras by the processor invoking a program instruction stored in a memory.

The capturing module 703 is configured to capture, by using the target camera, an image that includes a target scene, and the capturing module 703 may be implemented by the processor, and store a captured image into the memory.

The image processing module 704 is configured to obtain an output image of the target scene based on the captured image that includes the target scene. The image processing module 704 may be implemented by the processor, and may be implemented by invoking data and an algorithm in a local memory or a cloud server for corresponding computing, and a picture of the target scene that a user expects to obtain is output.

In one embodiment, the obtaining module 701 is configured to perform the method mentioned in step 21 and an equivalently replaceable method; the determining module 702 is configured to perform the method mentioned in step 22 and an equivalently replaceable method; the capturing module 703 is configured to perform the method mentioned in step 23 and an equivalently replaceable method; and the image processing module 704 is configured to perform the method mentioned in step 24 and an equivalently replaceable method.

More specifically, at different target zoom ratios:
the obtaining module 701 and the determining module 702 may collaboratively perform the methods of S101, S201, S301, S401, or S501;
the capturing module 703 may perform the methods of S102, S202, S302, S402, or S502; and
the image processing module 704 may perform the methods of S103 to S105, S203 and S204, S303 to S305, S403 to S405, or S503 to S506.

The foregoing specific method embodiments and the explanation, description, and extension of a plurality of implementation forms of the technical features in the embodiments are also applicable to method execution in the apparatus. Details are not described in the apparatus embodiments.

Embodiments of the present disclosure provide an image processing apparatus 700. Different camera combinations may be used according to different zoom requirements, to shoot and process images to achieve an approximately 5× lossless zoom effect without using a large-volume device, thereby improving terminal use experience of the user and an image quality requirement.

It should be understood that division of the modules of the apparatus 700 is merely division of logical functions. During actual implementation, all or some of the modules may be integrated into a physical entity or may be physically separated. For example, the modules may be separately disposed processing elements or may be integrated into a chip of the terminal for implementation. In addition, the modules may be stored in a form of program code in a storage element of a controller and invoked by a processing element of the processor to perform functions of the modules. In addition, the modules may be integrated or may be independently implemented. The processing element herein may be an integrated circuit chip and has a signal processing capability. In one embodiment, steps in the foregoing methods or the foregoing modules may be implemented by using a hardware integrated logical circuit in the processing element or by using an instruction in a form of software. The processing element may be a general-purpose processor, for example, a central processing unit (CPU), or may be configured as one or more integrated circuits for implementing the foregoing methods, for example, one or more application-specific integrated circuits (ASIC), one or more digital signal processors (DSP), or one or more field-programmable gate arrays (FPGA).

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments disclosed herein. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure are described, a person skilled in the art can make a change and a modification to these embodiments once he learns the basic inventive concept. Therefore, it is intended to construe the following claims as to cover the embodiments enumerated and all changes and modifications falling within the scope of the present disclosure. Obviously, a person skilled in the art can make various modifications and variations to the embodiments of the present disclosure without departing from the spirit and scope of the embodiments of the present disclosure. The present disclosure is intended to cover the modifications and variations of the embodiments of the present disclosure provided that these modifications and variations fall within the scope of protection defined by the following claims and their equivalent technologies.

What is claimed is:

1. A method for image or video shooting, comprising:
    determining whether a current zoom ratio is within a zoom range of (1, 3);
    in response to determining that the current zoom ratio is within the zoom range of (1, 3), respectively capturing, by using a first camera and a second camera, at least one color image and at least one black-and-white image that comprise a target scene;
    determining whether the current zoom ratio is within a zoom range of [3, 10] and whether illuminance of the target scene is lower than a preset threshold;
    in response to determining that the current zoom ratio is within the zoom range of [3, 10], and that the illuminance of the target scene is lower than the preset threshold, respectively capturing, by using a third camera and the second camera, at least one color image and at least one black-and-white image that comprise the target scene; and
    in response to determining that the current zoom ratio is within the zoom range of [3, 10], and that the illuminance of the target scene is not lower than the preset threshold, capturing, by using the third camera, at least one color image that comprises the target scene;
    wherein the first camera and the third camera are color cameras, and the second camera is a black-and-white camera, the first camera, the second camera, and the third camera are cameras using prime lenses, an equivalent focal length of the third camera is greater than both an equivalent focal length of the first camera and an equivalent focal length of the second camera, the first camera, the second camera, and the third camera are located on a rear side of a terminal, and the equivalent focal length of the third camera is 2 to 4 times the equivalent focal length of the first camera; wherein resolution of the first camera or resolution of the third camera is less than resolution of the second camera; and
    obtaining an output image of the target scene based on at least one image captured by at least one camera from the first, second, and third cameras, wherein the at least one image comprises the target scene.

2. The method according to claim 1, wherein the equivalent focal length of the first camera is 26 mm or 27 mm.

3. The method according to claim 1, wherein an aperture value of the first camera is 1.7 or 1.8.

4. The method according to claim 1, wherein an aperture value of the third camera is 2.4 or 2.2.

5. A terminal, comprising:
    a first camera, a second camera, and a third camera, wherein the first camera and the third camera are color cameras, the second camera is a black-and-white camera, and the first camera, the second camera, and the third camera are cameras using prime lenses, an equivalent focal length of the third camera is greater than both an equivalent focal length of the first camera and an equivalent focal length of the second camera, the first camera, the second camera, and the third camera are located on a rear side of the terminal, and the equivalent focal length of the third camera is 2 to 4 times the equivalent focal length of the first camera; wherein resolution of the first camera or resolution of the third camera is less than resolution of the second camera;
    a processor; and
    a memory coupled to the processor to store a computer program and instructions, which when executed by the processor, cause the processor to perform operations, the operations including:
    determining whether a current zoom ratio is within a zoom range of (1, 3);
    in response to determining that the current zoom ratio is within the zoom range of (1, 3), respectively capturing, by using the first camera and the second camera, at least one color image and at least one black-and-white image that comprise a target scene;

determining whether the current zoom ratio is within a zoom range of [3, 10] and whether illuminance of the target scene is lower than a preset threshold;

in response to determining that the current zoom ratio is within the zoom range of [3, 10], and that the illuminance of the target scene is lower than the preset threshold, respectively capturing, by using the third camera and the second camera, at least one color image and at least one black-and-white image that comprise the target scene; and in response to determining that the current zoom ratio is within the zoom range of [3, 10], and that the illuminance of the target scene is not lower than the preset threshold, capturing, by using the third camera, at least one color image that comprises the target scene; and obtaining an output image of the target scene based on at least one image captured by at least one camera from the first, second, and third cameras, wherein the at least one image comprises the target scene.

6. The terminal according to claim 5, wherein the equivalent focal length of the first camera is 26 mm or 27 mm.

7. The terminal according to claim 5, wherein an aperture value of the first camera is 1.7 or 1.8.

8. The terminal according to claim 5, wherein an aperture value of the third camera is 2.4 or 2.2.

9. An apparatus for image or video shooting, comprising:
a non-transitory machine-readable medium having instructions stored therein, which when executed by one or more processors, cause the one or more processors to:

determine whether a current zoom ratio is within a zoom range of (1, 3);

in response to determining that the current zoom ratio is within the zoom range of (1, 3), respectively capture, by using a first camera and a second camera, at least one color image and at least one black-and-white image that comprise a target scene;

determine whether the current zoom ratio is within a zoom range of [3, 10] and whether illuminance of the target scene is lower than a preset threshold;

in response to determining that the current zoom ratio is within the zoom range of [3, 10], and that the illuminance of the target scene is lower than the preset threshold, respectively capture, by using a third camera and the second camera, at least one color image and at least one black-and-white image that comprise the target scene; and in response to determining that the current zoom ratio is within the zoom range of [3, 10], and that the illuminance of the target scene is not lower than the preset threshold, capture, by using the third camera, at least one color image that comprises the target scene;

wherein the first camera and the third camera are color cameras, and the second camera is a black-and-white camera, the first camera, the second camera, and the third camera are cameras using prime lenses, an equivalent focal length of the third camera is greater than both an equivalent focal length of the first camera and an equivalent focal length of the second camera, the first camera, the second camera, and the third camera are located on a rear side of the apparatus, and the equivalent focal length of the third camera is 2 to 4 times the equivalent focal length of the first camera; wherein resolution of the first camera or resolution of the third camera is less than resolution of the second camera; and obtain an output image of the target scene based on at least one image captured by at least one camera from the first, second, and third cameras, wherein the at least one image comprises the target scene.

10. The apparatus according to claim 9, wherein the equivalent focal length of the first camera is 26 mm or 27 mm.

11. The apparatus according to claim 9, wherein an aperture value of the first camera is 1.7 or 1.8.

12. The apparatus according to claim 9, wherein an aperture value of the third camera is 2.4 or 2.2.

* * * * *